Oct. 31, 1950     G. W. ASHLOCK, JR     2,528,294
FRUIT PITTING CHUCK
Filed Aug. 10, 1949
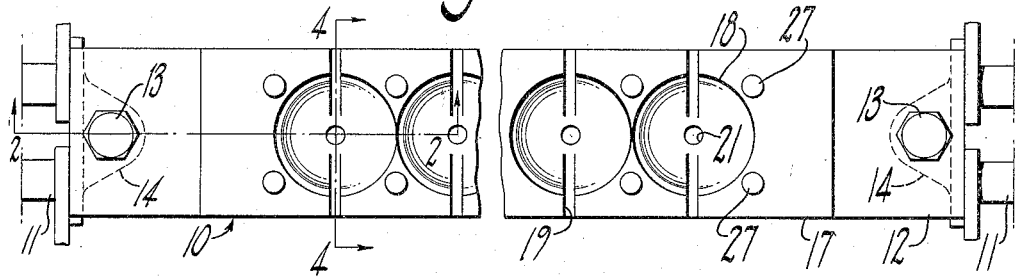
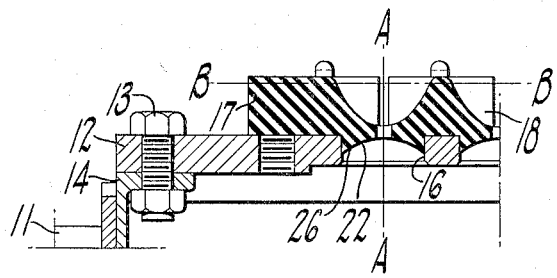
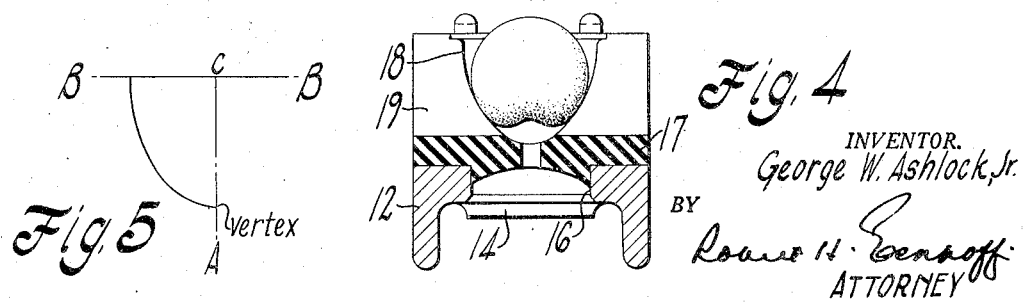
INVENTOR.
George W. Ashlock, Jr.
BY
ATTORNEY Patented Oct. 31, 1950

2,528,294

UNITED STATES PATENT OFFICE 2,528,294

FRUIT PITTING CHUCK

George W. Ashlock, Jr., Oakland, Calif.

Application August 10, 1949, Serial No. 109,547

3 Claims. (Cl. 146—19)

This is a continuation-in-part of my application Serial No. 771,661 filed September 2, 1947, which became abandoned December 10, 1949.

This invention relates to an improved machine for use in removal of the stone or pit from fruits having such an element confined within the meat of the fruit.

In preparing fruit for pitting, it is essential that the fruit first be placed in a predetermined position so that the pit can be removed from the fruit by a knife or the like with as little harm to the fruit as is feasible. For example, in pitting machines of the general type disclosed in my Patents Nos. 2,157,518 and 2,219,832, the fruit is first positioned with the stem or dimple end of the fruit downwardly and in alignment over an aperture in a suitable supporting chuck. Thereafter, a knife is caused to cut the fruit and force the pit out through the stem end of the fruit with little change in the exterior appearance of the fruit. In the machine shown in my co-pending application, Serial No. 767,772 filed August 9, 1947, I have shown a machine particularly suited to the handling of cherries having attached stems, the cherries being positioned upon their sides, the pits being removed through the side of the fruit so as not to break the stem attachment. In any case, it is desirable that the fruit, when at rest, be stably positioned and be supported in such a manner that a subsequent pitting or cutting operation does not disturb the position of the fruit.

The fruit pitting chucks utilized heretofore have been of the general type disclosed in my Patents 2,209,305 of July 30, 1940 and 2,314,862 of March 30, 1943. Each of these chucks includes a metal bar having a rubber facing strip attached thereto, there being a plurality of fruit receiving receptacles in the rubber facing strip to support each fruit during such alignments by such mechanisms as are disclosed in Patents 1,742,653, 2,212,892, 2,212,893, 2,250,518, 2,271,675, 2,296,400, 2,308,038, 2,308,039, 2,387,709 and 2,406,311, or as is disclosed in the aforementioned co-pending application. The cavity providing each fruit receiving receptacle, as appears in Patents 2,209,305 and 2,314,862, has been circular in cross section and has been formed by providing a semi-spherical indentation in the material providing the chuck. While chucks having receptacles formed by semi-spherical cavities have been widely used, nevertheless I have observed that their operation can be improved in that such a cavity did not support the fruit in a stable manner between the orientation station and the pitting station. In other instances, I have observed that fruit arriving at the pitting station, changed position during the pitting operation whereby the fruit was damaged or undesirably bruised.

I have now discovered that by providing a receptacle having the cavital fruit supporting portion thereof corresponding substantially to that generated upon rotation about an axis of an arcuate conic section, e. g., an ellipse, a parabola, a hyperbola or a portion of a circle; as I will explain, the fruit can be stably positioned more readily and, when so positioned, retains its position with greater surety. In addition, the fruit does not tend to change position during the pitting operation even though the pitting operation is performed with great rapidity; this is so irrespective of whether the fruit is pitted with the pit ejected through one end of the fruit or through the side of the fruit.

It is generally the broad object of the present invention to provide an improved fruit pitting machine which can be employed with various fruits to be pitted such as cherries, peaches, plums, prunes, dates and the like.

Another object of the present invention is to provide a novel form of fruit pitting chuck, particularly adapted to the pitting of fruit such as cherries, peaches, plums, prunes, dates and the like.

The invention includes other objects and features of advantage, some of which, together with the foregoing, will appear hereinafter wherein the present preferred form of fruit pitting chuck of this invention is disclosed.

In the drawings accompanying and forming a part hereof,

Figure 1 is a plan view showing a fruit pitting chuck assembly.

Figure 2 is a section taken along the line 2—2 of Figure 1.

Figure 3 is a side elevation, partly in section, showing the fruit pitting chuck of the present invention in conjunction with suitable means for turning the fruit into a position wherein it is in a desired position of alignment.

Figure 4 is a section along the line 4—4 of Figure 1, illustrating orientation of a cherry or the like into a desired position of alignment.

Figure 5 is a diagram employed to explain in part the construction of the chuck.

The fruit pitting device of the present invention comprises a structure generally indicated at 10 and adapted to be mounted between opposite conveyor chains 11 in the manner disclosed in my aforementioned Patents 2,157,518 and 2,219,832, the chains being movable to convey fruit positioned upon the fruit pitting chuck to suitable pitting mechanism such as that disclosed in said patents. Each chuck is made up of a metal base plate 12, the plate being in the form of a channel and secured by bolts 13 to a bracket 14 extending from each of the conveyor chains in a well known manner.

Each plate 12 includes a plurality of apertures 16. These are usually circular in cross section but their form can be varied so long as it does not interfere with the functioning of the mechanism utilized to process the fruit, such as the aforementioned pitting mechanism.

To provide for actual reception of the fruit to be carried and processed, I provide a facing sheet 17 of a suitable resilient material such as natural rubber, or any one of those resilient materials which are frequently employed as equivalents or substitutes for rubber. The resilient facing sheet 17 is preferably flat on its upper face so that when a plurality of individual pitting devices 10 are attached between the conveyor chains 11, they form a flat, continuous work surface with the rubber facing sheet uppermost.

Each plate includes a series of suitable fruit receiving receptacles 18; each receptacle may be cut or slotted as at 19 to permit the functioning of the orienting mechanism shown in my Patents Nos. 2,212,892 and 2,212,893, wherein rod-like members are extended through the slots to apply a turning or rotative force to the fruit. Such a force can also be applied by mechanisms as are shown in my Patents 2,213,893, 2,296,490, 2,387,709, and 2,406,311. In addition, the slots permit the use of knives, saws or the like to sever the fruit subsequently, as desired.

Each receptacle includes an aperture 21 provided adjacent the bottom thereof to permit the fruit pit or stone to be ejected. In addition, the bottom of each receptacle 18 is formed with a depending portion 26 which fits snugly against the sides of plate 12 and which define the aperture 16 to lend support to that portion of the receptacle which extends across the aperture 16. Also, the face 22, defining the bottom portion of the receptacle extending across the aperture 16 is made slightly concave to provide resilient support for the aperture 16.

Each facing strip 17 is positioned detachably on the base plate 12 by a plurality of pins 27, pressed into the base plate and which extend upwardly therefrom into suitable apertures formed in the resilient facing strip 17; four pins are preferably provided about each receptacle, the pins being spaced 90° apart.

In accordance with the present invention, the shape of the receptacle 18, and particularly the fruit supporting portion thereof, is of a conoidal contour. Thus, referring particularly to Figures 2 and 4, it is to be noted that the cavity there shown in section is of an ellipsoidal shape. I have determined that in an aperture of a size suitable for admission of any given grade of fruit, the fruit supporting portion of the aperture should have a ratio of width to effective depth of between 0.6 and 1.8. The width of the cavity must, of course, be sufficient to admit the fruit readily even though its major axis is not aligned with the axis of symmetry of the cavity. The width is measured across the cavity at right angles to the axis of symmetry of the cavity and at an elevation above the bottom of the cavity corresponding to the effective depth of the cavity. By effective depth, I refer to the depth of that portion of the cavity which is active in orientation or pitting of the fruit. With fruit of a small diameter such as small cherries, the effective depth of the cavity is generally about equal to half the length of the major axis of the fruit and even as much as about 0.6 of the major axis to ensure that the force application during orientation does not cause the fruit to bounce or roll from the cavity. As the average diameter of the fruit is increased, the relative magnitude of the effective depth required for the cavity decreases with respect to the major axis of the fruit and with big cherries and fruit of an even larger size, the effective depth can be as small as about a fourth the major axis, for the larger mass makes the fruit less liable to bounce out of the cavity. The ratio between the width and the effective depth can be varied within the limits indicated; that is, between 0.6 and 1.8. For cherries, I have used a ratio of 1.3 and for olives of an elongated shape, a ratio of 0.8. Dates require a ratio of 0.8 and even less while more nearly spherical fruit can be handled in a cavity embodying a ratio of 1.3 and up to 1.8.

With a conoidally shaped cavity, the fruit is stably engaged by a lower portion of the cavity in which position it is retained, following orientation and during any subsequent fruit processing such as a stone removing operation. Generally it is only necessary to make so much of the bottom portion or fruit supporting portion of the cavity of a conoidal shape as is active in the pitting of the fruit. In Figure 4 I have shown knife 51 in cooperative position over a cavity, to be moved by any suitable mechanism, such as that of my Patents 2,157,518 and 2,219,832, to cut the stone from the fruit and force it through the cavity aperture 21. The knife, in pitting, tends to turn the fruit unless a cavity of the correct conoidal shape is employed. The cavity shown in Figure 4 is relatively deep because it is for use on cherries having stems, the deep cavity being utilized to align the stems. In any case, the upper portion of the cavity need not continue the conoidal shape of the lower portion of the cavity since the upper or rim portion merely provides a mechanical retaining means preventing the fruit from bouncing out of the cavity during initial feeding of the fruit by some mechanism as that disclosed in my Patents 2,190,970, 2,213,893, 2,288,062 or my co-pending application. With a spheroidally shaped supporting cavity and a spheroidally shaped fruit, stoning with a knife moved parallel to the vertical axis of the cavity frequently results in the pit or stone being forced through the bottom or sidewall of the receptacle instead of through the aperture provided for stone passage. This, of course, ruins the cavity for further orientation and pitting. This mis-ejection of the stone is prevented with a conoidally shaped cavity. If desired, the conoidal shape can be largely confined to the bottom and a portion of the side wall of the cavity as is shown in Figures 1-4.

The conoidal contour of the fruit supporting portion of the cavity stably supports the fruit and facilitates orientation of the fruit into a desired position for once the fruit is positioned with its dimple downward, it rests stably on the ellipsoidal supporting side wall of the receptacle. Referring particularly to Figure 3, I have shown suitable fruit orienting means of the type generally disclosed in my Patent 2,406,311. This means comprises a plurality of toothed rods 31 rotatably mounted in a cross-member 32, which is slidable upon guides 33 attached to each plate 12. When a toothed rod 31 is projected upwardly to within the cavity 18 by suitable driving engagement of wheels 35 and sliding of member 32 upon rods 33, the fruit is engaged, as is disclosed in my Patent 2,406,311, and is turned until the dimpled end of the fruit is down. One can, of course, use other orienting means, as I have indicated, in place of that herein disclosed, to apply an orienting force to the fruit; such a force can be applied by any of the known orienting devices to which I have heretofore made reference such as rotatable pins or wheels or the vibrating rods.

Having determined the effective depth and the width to be employed in relation to the average size of the fruit to be oriented or pitted, one can draw two lines at right angles as in Figure 5, where line B—B corresponds to the width and A—C to the effective depth and A—C intersects B—B at its midpoint. The lowest point A is then connected to one of the points B by a conic section, e. g., a parabola, an ellipse or a hyperbola, the end portion of such conic section being employed and point A being taken as the vertex of the section. If it is desired to use a circular segment, then an arc is struck connecting points A and B; the radius used to strike the circular segment should be from 1.2 to 2.0 the effective depth.

The points A and B being connected, the connecting conic section is rotated about the line AC in Figure 5 or axis A—A in Figure 2 to generate the conoidal cavity; the term conoidal cavity, as used herein and in the claims, is employed as referring to a cavity attained within the foregoing limitations.

I claim:

1. A receptacle for retaining fruit in a desired position upon an operation including application of a turning force to the fruit, said receptacle having a conoidal cavity therein, as said cavity is herein defined, symmetrically disposed about its major axis and corresponding to an end portion of a conoid generated by rotation of a conic section about said major axis, said cavity having an effective depth of between about 0.25 and 0.6 of the major axis of said fruit, and of a width adequate to admission of the fruit, the ratio of the width of the cavity to its effective depth being between about 0.6 and 1.8.

2. A receptacle for retaining fruit in a desired position upon an operation including application of a turning force to the fruit, said receptacle having a conoidal cavity therein, as said cavity is herein defined, symmetrically disposed about its major axis and corresponding to an end portion of a conoid generated by rotation of a conic section about said major axis, said cavity having an effective depth of about 0.5 of the major axis of said fruit, and a width adequate to admission of the fruit, the ratio of the width of the cavity to its effective depth being about 1.3.

3. A machine for positioning a fruit in a stable position comprising a receptacle, said receptacle having a conoidal cavity therein of a width adequate to substantial admission of the fruit, said cavity having a major axis and being symmetrically disposed about said axis, said cavity having an aperture in the bottom aligned with said axis, the fruit supporting portion of the cavity adjacent to said aperture having the shape of substantially the complete end portion of a conoid along any plane coincident with said major axis, the cavity having an effective depth of between about 0.25 and 0.6 of the major axis of the fruit, the ratio of the width of the cavity to its effective depth being between about 0.6 and 1.8, and means projecting through said aperture for turning a fruit in said cavity into a position wherein the dimple is downward and the fruit is supported by the conoidal portion of the cavity and the major axis of the ellipse passes therethrough.

GEORGE W. ASHLOCK, JR.

REFERENCES CITED

The following references are of record in the file of this patent:

UNITED STATES PATENTS

| Number | Name | Date |
|---|---|---|
| 169,525 | Darrach | Nov. 2, 1875 |
| 1,155,449 | Smith | Oct. 5, 1915 |
| 1,742,653 | Goranson et al. | Jan. 7, 1930 |
| 2,180,647 | Steinbiss | Nov. 21, 1939 |
| 2,209,305 | Ashlock, Jr. | July 30, 1940 |
| 2,271,675 | Ashlock, Jr | Feb. 3, 1942 |
| 2,406,311 | Ashlock, Jr. | Aug. 27, 1946 |